United States Patent
Hakeem et al.

(10) Patent No.: US 9,543,874 B2
(45) Date of Patent: Jan. 10, 2017

(54) DUAL ALTERNATOR SYSTEM

(71) Applicants: Mohannad Hakeem, Dearborn, MI (US); Rebecca R Franke, Sterling Heights, MI (US); Van Lee, Farmington Hills, MI (US)

(72) Inventors: Mohannad Hakeem, Dearborn, MI (US); Rebecca R Franke, Sterling Heights, MI (US); Van Lee, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 164 days.

(21) Appl. No.: 14/552,696

(22) Filed: Nov. 25, 2014

(65) Prior Publication Data

US 2015/0162861 A1    Jun. 11, 2015

Related U.S. Application Data

(60) Provisional application No. 61/912,801, filed on Dec. 6, 2013.

(51) Int. Cl.
*H02P 9/48* (2006.01)
*H02J 7/14* (2006.01)

(52) U.S. Cl.
CPC ............... *H02P 9/48* (2013.01); *H02J 7/1423* (2013.01); *H02J 7/1446* (2013.01); *H02J 2007/143* (2013.01); *Y02T 10/32* (2013.01)

(58) Field of Classification Search
CPC ........ H02P 9/48; H02J 2007/43; H02J 7/1446; H02J 7/1423

USPC ............................................... 322/28; 307/11
See application file for complete search history.

(56) References Cited

U.S. PATENT DOCUMENTS

| | | | |
|---|---|---|---|
| 2,872,591 A | 2/1959 | Stineman | |
| 4,239,978 A * | 12/1980 | Kofink | H02M 7/08 307/10.6 |
| 5,097,165 A * | 3/1992 | Mashino | H02J 7/1423 307/84 |
| 5,723,972 A | 3/1998 | Bartol et al. | |
| 5,739,676 A | 4/1998 | Judge et al. | |
| 6,369,549 B1 * | 4/2002 | Brefeld | H02J 7/1423 322/11 |
| 6,657,416 B2 * | 12/2003 | Kern | H02J 9/066 290/40 A |
| 7,019,495 B2 | 3/2006 | Patterson | |

(Continued)

*Primary Examiner* — Tulsidas C Patel
*Assistant Examiner* — Sean Gugger
(74) *Attorney, Agent, or Firm* — Ralph E Smith

(57) ABSTRACT

A dual alternator system includes a main alternator controlled by an electronic voltage regulator, a secondary alternator system having a secondary alternator controlled by a LIN controlled alternator voltage regulator and an electronic control unit ("ECU") coupled to the LIN controller alternator voltage regulator by a LIN bus that that determines whether the secondary alternator should be off or operated to generate current. The ECU when it determines that the secondary alternator should be off sends a voltage setpoint signal to the LIN controlled alternator voltage regulator having a low value that is well below nominal system voltage. The ECU when it determines that the secondary alternator should be operated to provide current sends a voltage setpoint to the LIN controlled alternator voltage regulator having a high value that is well above a nominal system voltage and a MECL setpoint value.

12 Claims, 4 Drawing Sheets

(56) References Cited

U.S. PATENT DOCUMENTS

| | | | |
|---|---|---|---|
| 7,365,519 B2 | 4/2008 | Gibbs et al. | |
| 7,936,092 B2 | 5/2011 | Peuser | |
| 8,766,479 B2 * | 7/2014 | Dorn | H02J 3/42 |
| | | | 290/31 |
| 2005/0046396 A1 * | 3/2005 | Patterson | B60R 16/03 |
| | | | 322/28 |
| 2005/0134120 A1 * | 6/2005 | Nguyen | H02J 3/04 |
| | | | 307/43 |
| 2006/0208709 A1 * | 9/2006 | Labitzke | H02J 1/10 |
| | | | 322/28 |
| 2007/0273205 A1 * | 11/2007 | Aoyama | H02J 7/245 |
| | | | 307/3 |

* cited by examiner

DUAL ALTERNATOR SYSTEM

CROSS-REFERENCE TO RELATED APPLICATIONS

This application claims the benefit of U.S. Provisional Application No. 61/912,801, filed on Dec. 6, 2013. The entire disclosure of the above application is incorporated herein by reference.

FIELD

The present invention relates to a dual alternator system having two alternators with different current ratings and the control of the two alternators.

BACKGROUND

In certain types of vehicles, such as medium and heavy duty trucks, it is advantageous to provide the electrical system with multiple electrical generating machines, which are alternators or generators depending on whether the electrical system uses alternators or generators. For example, for utility and up-fitted trucks that use on 12V battery, many applications require the use of a dual alternator system. This can generate about 400 A of current that can feed on-board electric devices (such as electric devices on emergency vehicles) without compromising battery life, state of charge (SOC) of the battery, and depth of discharge ("DOD") of the battery. For convenience the discussion herein will be the context of alternators, it being understood that it also applies to generators.

A voltage regulator is used to regulate the output voltage of the alternator. Typically, the voltage regulator varies the voltage of the field of the alternator to regulate the output voltage of the alternator. In many applications, the alternator has an internal voltage regulator.

In certain applications having a single alternator, an external electronic voltage regulator has been used. In one such application, the external electronic voltage regulator is implemented in the electronic control unit (ECU) that is also used as the engine control module of a vehicle. In this application, the external voltage regulator outputs a pulse width modulated drive signal to the field winding of the alternator and varies field voltage of the alternator to regulate the output voltage of the alternator by varying the duty cycle of the pulse width modulated signal. As used herein, an "electronic voltage regulator" is a device that generates a pulse width modulated drive signal that is used to energize the field windings of an electrical generating machine. The device is for example implemented in hardware or a combination of hardware and software. The device is for example a stand-alone device or is for example implemented as part of another device, such as the engine control module of a vehicle. The electronic voltage regulator for example generates the pulse width modulated drive by directly generating it or for example generates it by controlling another device, such as a power switching device by generating a pulse width modulated switching signal that is used to switch the power switching device.

FIG. 1 is a basic schematic showing the topology of a prior art electrical system 100 in which an external electronic voltage regulator is used to control the voltage of an alternator. Electrical system 100 is illustratively an automotive vehicle electrical system and is a part of an automotive vehicle, shown representatively by dashed box 102 in FIG. 1. The external electronic voltage regulator is illustratively implemented in an electronic control unit ("ECU") 110, that is also the engine control module for vehicle 102. More specifically, electrical system 100 has an alternator 104, battery 106, power distribution center 108 and ECU 110 that is the engine control module. ECU 110 includes an electronic voltage regulator 112 that controls the field voltage of field windings 114 of alternator 104. A voltage output (B+) of alternator 104 is coupled through a fusible link 116 to a positive terminal 118 of battery 106. A negative terminal 120 of battery 106 is coupled to ground.

Electronic voltage regulator includes error signal generator 122, PI controller 124, PWM signal generator 126 and power signal driver 128, which is illustratively a high side driver and may be referred to herein as high side driver 128.

The control of alternator 104 is managed by the electronic voltage regulator 112 in ECU 110 based on voltage feedback sense line "B+ Sense" coupled to a "B+ sense" output of alternator 104, which is coupled to the internal voltage output of alternator 104 through a B+ resistor. This sense voltage is compared by error signal generator 122 to a target voltage determined by the ECU 110 based on various parameters known to the ECU 110 from other sensors in the electrical system 100 (not shown in FIG. 1), such as battery temperature, engine speed, engine load and others. The comparison between the sense voltage and the target voltage produces an error signal which is used by PI controller 124 of electronic voltage regulator 112 to calculate the duty cycle for a PWM drive signal applied to field windings 114 of alternator 104 to control the field voltage and thus regulate the output of alternator 104. The field windings 114 of alternator 104 are coupled to an output 130 of ECU 110 at which the PWM drive signal is generated. More specifically, PI controller 124 of electronic voltage regulator 112 determines the duty cycle at which to drive the field windings 114 of alternator 104 and outputs to PWM signal generator 126 the value of this duty cycle, which is the PWM value in FIG. 1. PWM signal generator 126 generates a PWM signal having this duty cycle which is used to switch high side driver 128, which turns on and off the field of alternator 104. High side driver 128 is coupled through contacts 132 of an automatic shutdown relay (ASD) 134 of power distribution center 108 and a fuse 136 of power distribution center 108 to positive terminal 118 of battery 106. High side driver 128 is illustratively a high power switching semiconductor device, such as an SCR, Thyristor, IGBT, power MOSFET, or the like. The objective of this control system is to minimize the error signal, which implies that the sense voltage is being controlled to achieve the target voltage. The PI loop in PI controller 124 of electronic voltage regulator 112 is calibrated to optimize the overshoot, undershoot and settling time performance specifications for system voltage response to various disturbances.

SUMMARY

In accordance with an aspect of the present disclosure, a dual alternator system includes a main alternator controlled by an electronic voltage regulator, a secondary alternator system having a secondary alternator controlled by a LIN controlled alternator voltage regulator, and an electronic control unit ("ECU") coupled to the LIN controller alternator voltage regulator by a LIN bus. The ECU determines whether the secondary alternator should be off or operated to generate current based on whether a duty cycle of a pulse width modulated drive signal generated by the electronic voltage regulator to drive the main alternator is above a low threshold. The ECU when it determines that the secondary alternator should be off sends a voltage setpoint signal to the LIN controlled alternator voltage regulator having a low value that is well below nominal system voltage. The ECU when it determines that the secondary alternator should be operated to provide current sends a voltage setpoint to the LIN controlled alternator voltage regulator having a high value that is well above a nominal system voltage and a MECL setpoint value.

In an aspect of the disclosure, when the ECU determines that the secondary alternator should be operated to provide current the ECU sends the LIN controlled alternator voltage regulator the voltage set point having the high value and a MECL value that sets the duty cycle of a PWM drive signal generated by the LIN controlled alternator voltage regulator to drive the secondary alternator. In an aspect when the ECU determines that the secondary alternator should be operated to provide current it further determines whether to operate the dual alternator system in a medium load mode or a high load mode based on the duty cycle of the PWM signal driving the main alternator. The ECU determines to operate the dual alternator system in the medium load mode when the duty cycle of the PWM signal driving the main alternator is between the low threshold and a high threshold and to operate the dual alternator system in the high load mode when the duty cycle of the PWM signal is at or above the high threshold.

In an aspect, when dual alternator system is in the medium load mode, the ECU sends the LIN controlled alternator voltage regulator the voltage set point having the high value and a MECL value having a sufficiently low value that the LIN controlled alternator voltage regulator controls the secondary alternator in an open loop mode. In an aspect, when the dual alternator system is in the medium load mode, the ECU sends the LIN controlled alternator voltage a MECL value having a value that causes the LIN controlled alternator voltage regulator to control the secondary alternator in an open loop mode by generating a PWM drive signal that drives the secondary alternator having a constant duty cycle of about thirty percent.

In an aspect, when the dual alternator system is in the high load mode, the ECU sends the LIN controlled alternator voltage regulator the voltage set point having the high value and controls the secondary alternator with closed loop control by periodically adjusting the MECL value that the ECU sends to the LIN controlled alternator voltage regulator so that the duty cycle of the PWM drive signal that the LIN controlled alternator voltage regulator is maintained at a level where the secondary alternator provides that amount of current needed so that the duty cycle of the PWM drive signal driving the main alternator is maintained at about the high threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

Figure 1:
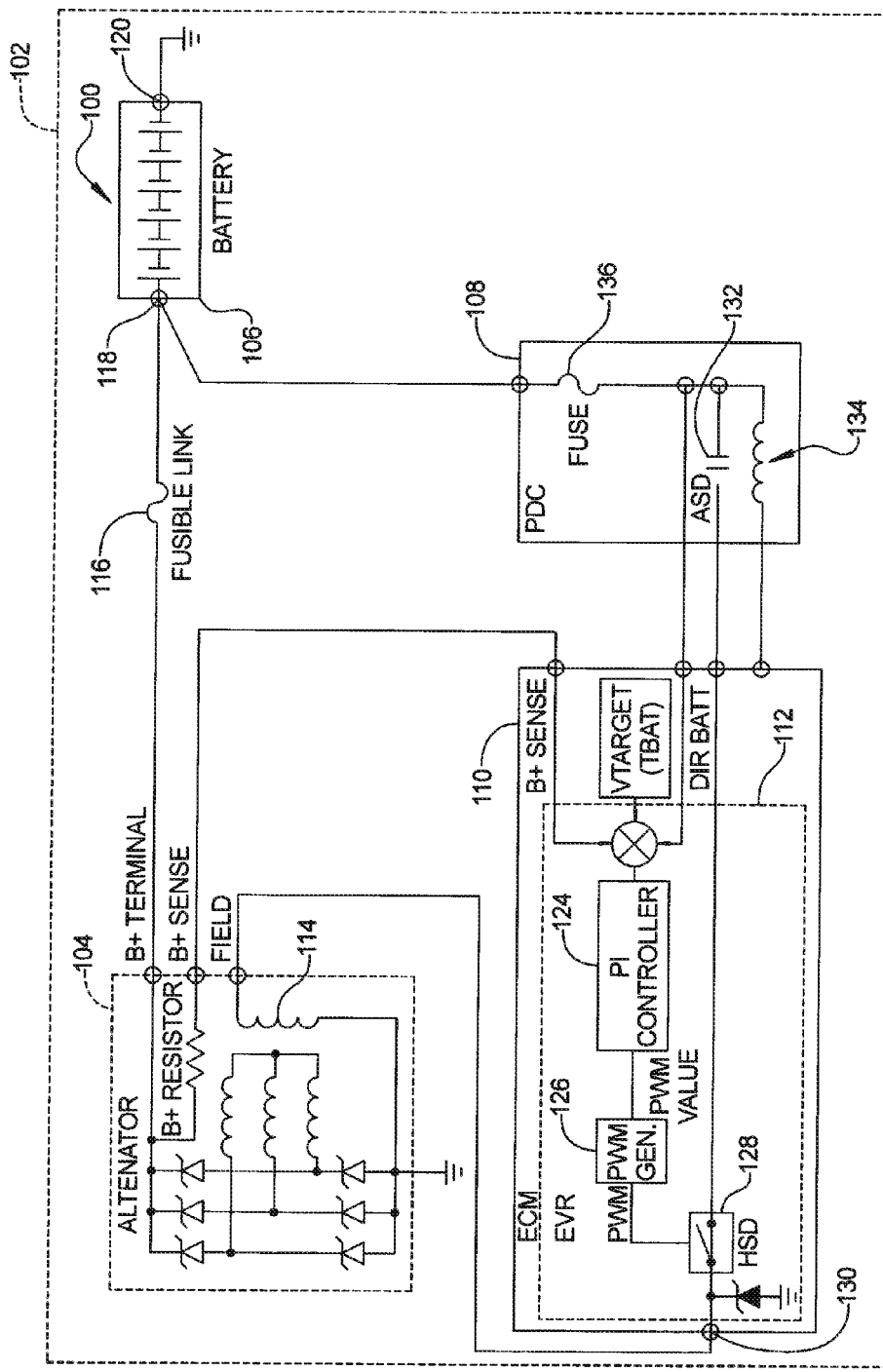
FIG. 1 is a simplified circuit topology of a prior art single alternator system.
Figure 2:
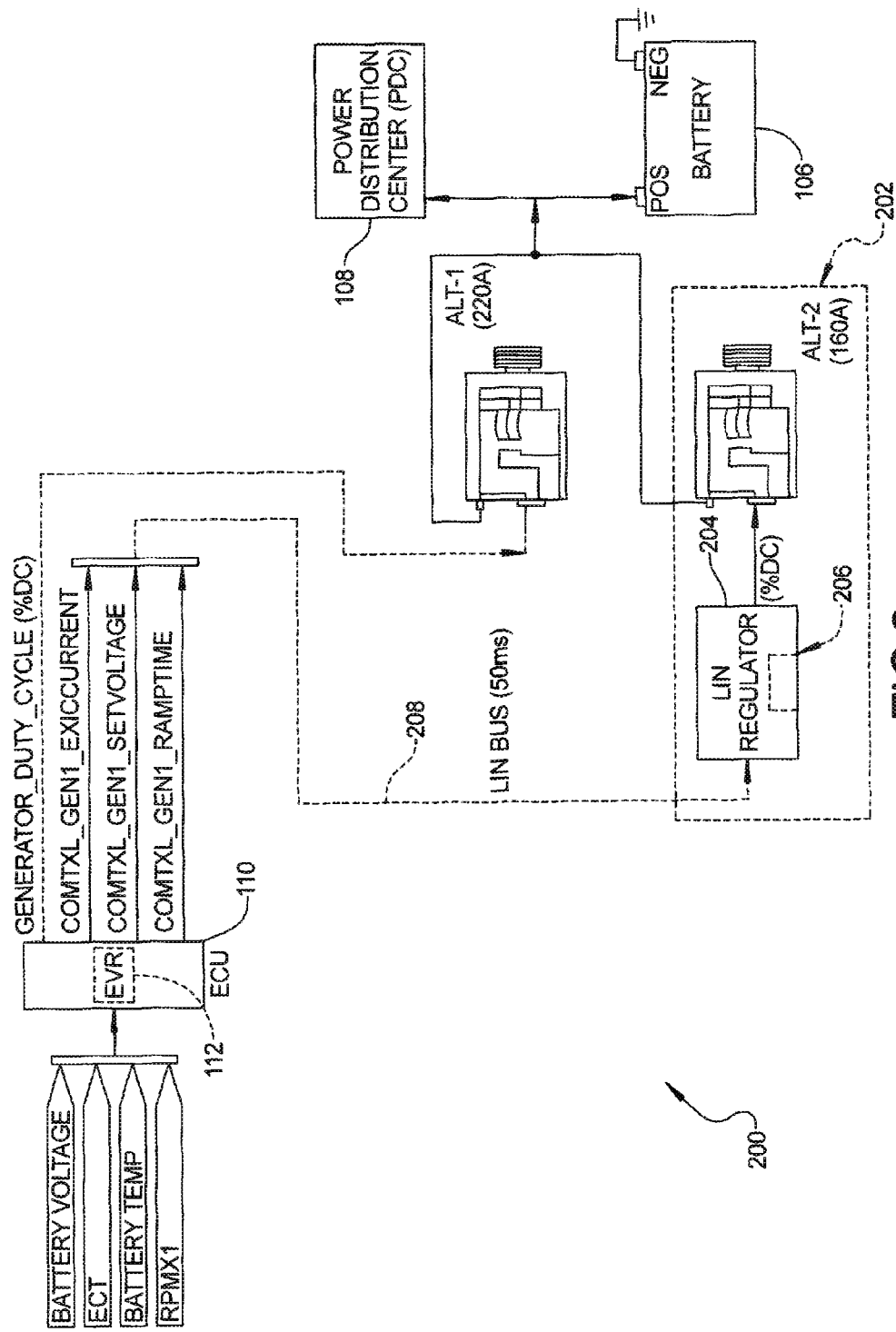
FIG. 2 is a simplified circuit topology of a dual alternator system in accordance with an aspect of the present disclosure.

With reference to FIG. 2, a simplified wiring topology of a dual alternator system 200 in accordance with an aspect of the present disclosure includes a main alternator ALT-1 and a secondary alternator ALT-2 which is part of a secondary alternator package 202 which also includes LIN controlled alternator voltage regulator 204. LIN controlled alternator voltage regulator includes a controller 206. A LIN controlled alternator voltage regulator is an electronic voltage regulator that receives set point values via a LIN bus, including the voltage set point value and MECL set point value which are of pertinence here. LIN controlled alternator voltage regulator 204 is for example a IRVR101 LIN Controlled Alternator Voltage Regulator available from International Rectifier of El Segundo, Calif., but may be other LIN controlled alternator voltage regulators. LIN means Local Interconnect Network and is a serial protocol used for communication between components in vehicle that are connected to a bus referred to as the LIN bus. It should be understood that other buses are used in vehicles for communication between components, such as the CAN (Controller Area Network) and vehicles often have one or more LIN buses and one or more CAN buses. LIN controlled alternator voltage regulator 204 is coupled to ECU 110 by LIN bus 208.

Illustratively, main alternator ALT-1 and secondary alternator ALT-2 have different current ratings. For example, main alternator ALT-1 has a current rating of 220 A and secondary alternator ALT-2 has a current rating of 160 A. It should be understood that main alternator ALT-1 can have a current rating other than 220 A and secondary alternator ALT-2 can have a current rating of other than 160 A.

Controlling both main alternator ALT-1 and secondary alternator ALT-2 in a way that ensures smooth operation presents a challenge because main alternator ALT-1 and secondary alternator ALT-2 are controlled by separate voltage regulators whose controllers operate at different rates. For example, the controller for electronic voltage regulator 112 operates at the CAN bus rate of 10 ms while the controller in LIN controlled alternator voltage regulator 204 operates at the LIN bus rate of 50 ms. The conventional control strategy specifies a voltage set point and uses a PID control loop to drive the error between the reference voltage and the actual system voltage to zero, as discussed above in the Background section of the present application. Controlling both main alternator ALT-1 and secondary alternator ALT-2 using this conventional control strategy may introduce instability in the overall dual alternator system 200 because both controllers will be competing against each other, since both controllers will be trying to drive the error (or what they perceive as the error) to zero. A control strategy for controlling main alternator ALT-1 and secondary alternator ALT-2 in accordance with an aspect of the present disclosure controls main alternator ALT-1 using the above described conventional voltage set-point control. Secondary alternator ALT-2 is controlled using the maximum excitation current limit (MECL) as the control point with a high set point voltage that is well above the typical system voltage of 13V-14V (referred to herein as the nominal system voltage), for example 15V (or about 15V) or 16V which is the maximum possible setpoint voltage. By well above the nominal system voltage, it is meant that the value of the voltage set point is above the maximum system voltage under normal operation including normal voltage fluctuations so that the system voltage would not under normal operating conditions reach the level of the voltage set point value. ECU 110 sends a set point voltage command of 15V via the LIN bus to LIN controlled alternator voltage regulator 204 and also sends a desired MECL set point command to LIN controlled alternator voltage regulator 204. When LIN controlled alternator voltage regulator 204 senses a system voltage that is less than the voltage set point of 16V (usually around 13V-14V), LIN controlled alternator voltage regulator 204 it will try to reach the voltage setpoint of 16V by producing its maximum output current, which is limited to the MECL set point received from ECU 110. This in turn limits the duty cycle of the PWM drive signal output to secondary alternator ALT-2 by LIN controlled alternator voltage regulator 204. The duty cycle of the PWM drive signal driving secondary alternator ALT-2 is thus controlled by the MECL set point sent by ECU 110 without resorting to the conventional voltage set point control method.

Figure 3:
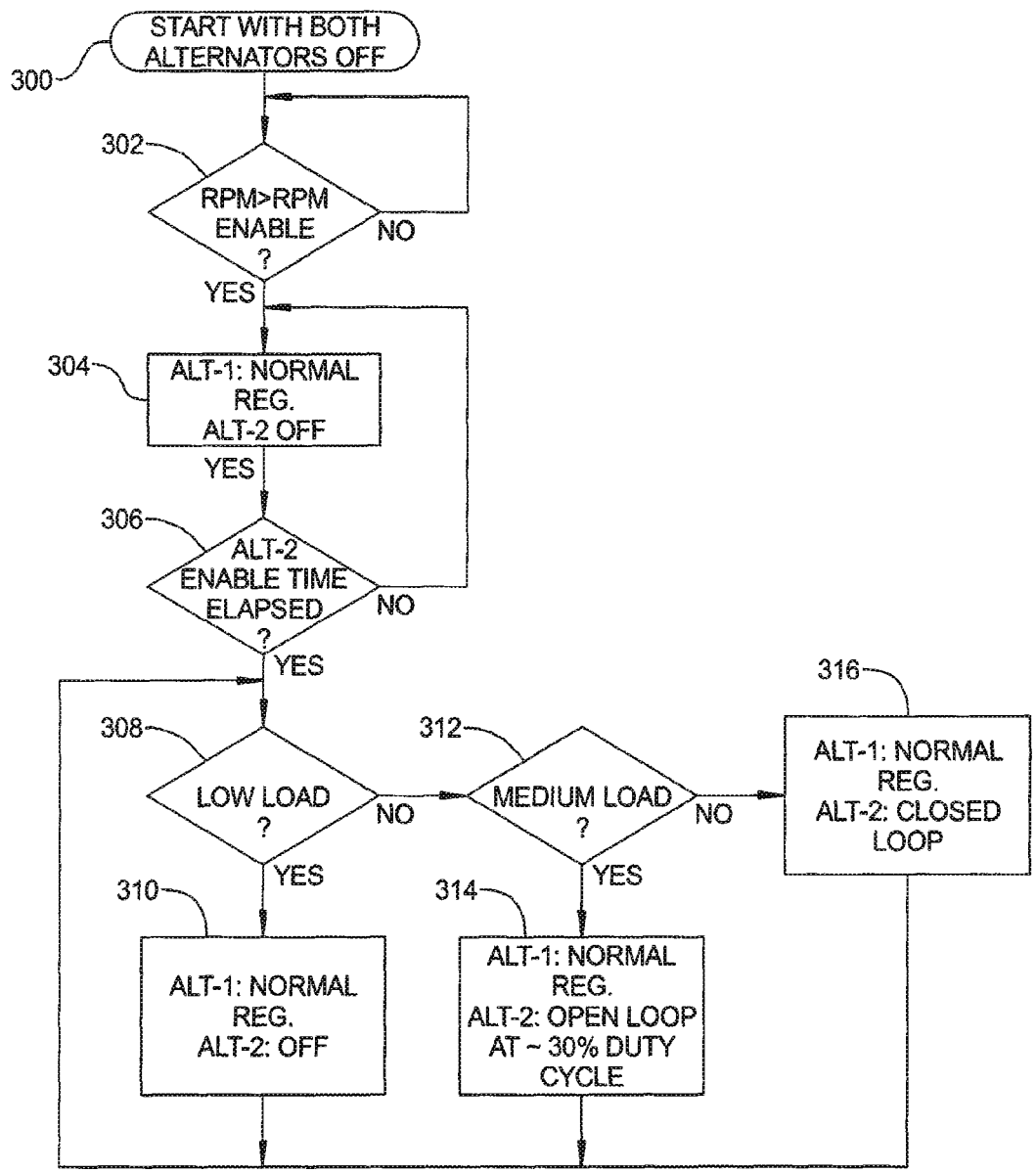
FIG. 3 is a flow chart of a control strategy for controlling the dual alternator system of FIG. 2.

With reference to FIG. 3, the control strategy for controlling secondary alternator ALT-2 using the MECL set point approach is described in more detail. The control strategy is illustratively be implemented in software programmed in ECU 110 (including electronic voltage regulator 112) and in the controller of LIN controlled alternator voltage regulator 204. At 300, both main alternator ALT-1 and secondary alternator ALT-2 are off. Once the engine starts, ECU 110 checks at 302 whether the RPM is above a calibratable threshold. If not, both main alternator ALT-1 and secondary alternator ALT-2 remain off. When the engine RPM is above the threshold, at 304 ECU 110 enables operation of main alternator ALT-1 and electronic voltage regulator 112 will generate a PWM drive signal to drive main alternator ALT-1 in accordance with the above described normal voltage regulation using conventional voltage set point control. As used herein, normal voltage regulation means voltage regulation using the conventional voltage setpoint control. If the engine RPM is not above the threshold, ECU 110 branches back to 302. At 306 ECU 110 checks whether an enable time for secondary alternator ALT-2 has elapsed as ECU 110 will enable operation of secondary alternator ALT-2 only after a certain time to avoid any interference that may affect torque and RPM stability. If the enable time has not elapsed, ECU 110 branches back to 306. If the enable time has elapsed, ECU will operate secondary alternator ALT-2 based on how much "help" is needed from secondary alternator ALT-2 based on duty cycle of the PWM drive signal driving main alternator ALT-1. Based on this duty cycle, ECU 110 identifies three modes of operation: Low-Load, Medium Load and High Load, described in more detail below.

The Low-Load mode of operation is now described. When the duty cycle of the PWM signal driving main alternator ALT-1 is at or below a low threshold (determined at 308 in FIG. 3) such as 15% (or about 15%), at 310 ALT1-2 is turned off by ECU 110 sending a low voltage setpoint (P-REG-SV) value to LIN controlled alternator voltage regulator 204 which is well below the nominal system voltage of 13V-14V. By well below the nominal system voltage, it is meant that the value of the voltage set point is below the minimum system voltage under normal operation including normal voltage fluctuations so that the system voltage would not under normal operating conditions fall to the level of the voltage set point value. For example, the low voltage setpoint value is 10.6V. Since this value will be below the nominal system voltage of 13V-14V, LIN controlled alternator voltage regulator will not operate secondary alternator ALT-2, such as by setting the duty cycle of the PWM signal driving secondary alternator ALT-2 at zero. Main alternator ALT-1 is operated in accordance with the normal voltage regulation using conventional voltage setpoint control.

The Medium Load mode of operation is now described and is the default mode for the operation of dual alternator system 200. When the duty cycle of the PWM signal driving main alternator ALT-1 is between the low threshold and a high threshold (~70%) (determined at 312 in FIG. 3), secondary alternator ALT-2 need not provide much additional current. Thus, at 314 secondary alternator ALT-2 will be operated in an open-loop mode by LIN controller alternator voltage regulator 204 driving secondary alternator ALT-2 with a PWM signal having a relatively low constant duty cycle, such as about thirty-percent. To do so, ECU 110 sends a high voltage set point (P-REG-SV) value to LIN controlled alternator voltage regulator 204 which will be above the typical system voltage of 13V-14V and also a MECL setpoint value having a minimal MECL value. For example, the high voltage setpoint value is 15V (or about 15V) and the MECL setpoint value is 2 A (or about 2 A). This results in LIN controlled alternator voltage regulator driving secondary alternator ALT-2 with a PWM drive signal having a constant duty cycle of thirty percent (or about thirty percent). The voltage regulation task is left to main alternator ALT-1 and its control.

Figure 4:
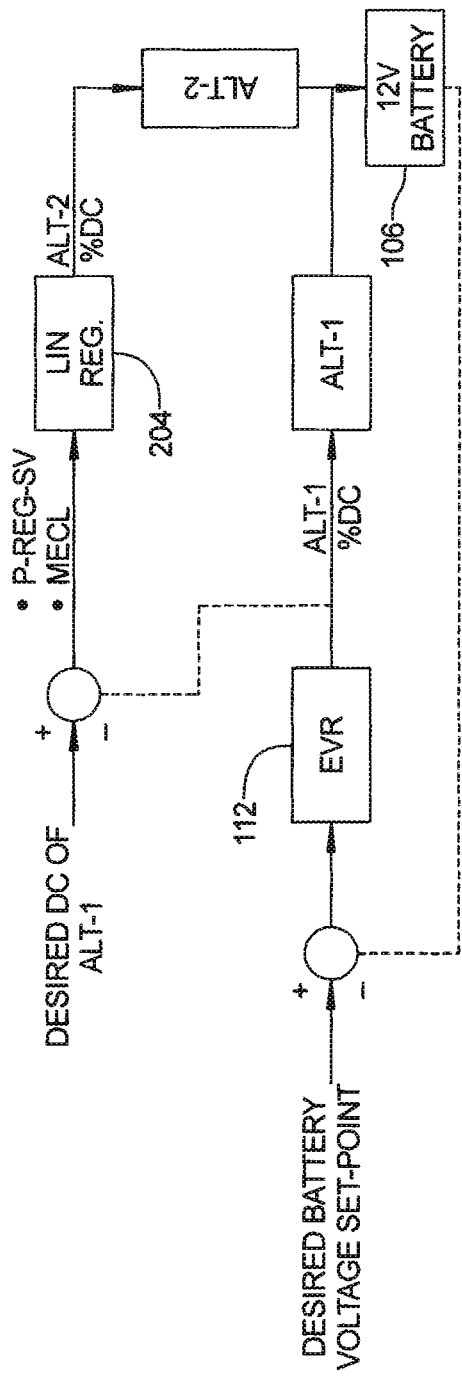
FIG. 4 is a control loop for controlling a secondary alternator of the dual alternator system of FIG. 2 when the dual alternator system is in a high load mode.

The High-Load mode of operation is now described. When the capacity of main alternator ALT-1 is approaching its maximum desired capacity, which occurs when the duty cycle of the PWM driving main alternator ALT-1 reaches the high threshold (for example 70% or about 70% as discussed above), more output current is needed from secondary alternator ALT-2. At 316 ECU 110 sends the high voltage set point value (15V or about 15V) to LIN controlled alternator voltage regulator 204 and initially increases the MECL setpoint from 2 A up to 7.5 A (or about 7.5 A). As discussed in more detail below, secondary alternator ALT-2 is operated by ECU 110 periodically adjusting the MECL setpoint value it sends to LIN controller alternator voltage regulator 204 to maintain the duty cycle of the PWM signal driving main alternator ALT-1 at the high threshold (70% or about 70% as discussed above). It should be understood that the maximum desired capacity of main alternator ALT-1 is below its maximum capacity as it typically desirable that an alternator operated under a moderate load as opposed to its maximum load. When dual alternator system 200 is in the High Load mode, ECU 110 calculates the MECL setpoint value to send to LIN controller alternator voltage regulator 204 using a control loop 400 (FIG. 4) that has a feedback input signal of the duty cycle of the PWM signal driving main alternator ALT-1. Control loop 400 is closed loop control and controls secondary alternator ALT-2 to maintain the PWM signal driving main alternator ALT-1 at the high threshold (70% or about 70% as discussed above.). Secondary alternator ALT-2 is thus controlled to provide only the additional current that is needed to keep main alternator ALT-1 moderately loaded (that is, at its maximum desired capacity which is moderately loaded as discussed above).

It should be understood that the low and high thresholds of the duty cycle of the PWM driving main alternator ALT-1 are RPM dependent and air charge temperature dependent, since these factors (in addition to alternator coil temperature) can affect the output current generated by an alternator. Consequently, in an aspect, ECU 110 adjusts the low and high duty cycle thresholds accordingly.

In addition to preventing system instability, the above control strategy allows secondary alternator package 202 to be added to a vehicle with minimal changes to the existing alternator and alternator control architecture, either as original equipment or as an aftermarket retrofit.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A dual alternator system, comprising:
   a main alternator controlled by an electronic voltage regulator and a secondary alternator system having a secondary alternator controlled by a local interconnect network (LIN) controlled alternator voltage regulator;
   an electronic control unit ("ECU") coupled to the LIN controlled alternator voltage regulator by a LIN bus;
   the ECU determining that the secondary alternator should be off when a duty cycle of a pulse width modulated drive signal generated by the electronic voltage regulator to drive the main alternator is not above a low threshold and determining that the secondary alternator should be operated to generate current when the duty cycle of the pulse width modulated drive signal generated by the electronic voltage regulator to drive the main alternator is above the low threshold;
   the ECU, when it determines that the secondary alternator should be off, sends a voltage setpoint signal to the LIN controlled alternator voltage regulator having a low value that is well below nominal system voltage; and
   the ECU, when it determines that the secondary alternator should be operated to provide current, sends a voltage setpoint to the LIN controlled alternator voltage regulator having a high value that is well above a nominal system voltage and a maximum excitation current limit (MECL) setpoint value.

2. The dual alternator system of claim 1 wherein when the ECU determines that the secondary alternator should be operated to provide current, the ECU sends the LIN controlled alternator voltage regulator the voltage set point having the high value and a MECL value that sets the duty cycle of a PWM drive signal generated by the LIN controlled alternator voltage regulator to drive the secondary alternator.

3. The dual alternator system of claim 2, wherein when the ECU determines that the secondary alternator should be operated to provide current, it further determines whether to operate the dual alternator system in a medium load mode or a high load mode based on the duty cycle of the PWM signal driving the main alternator, the ECU determining to operate the dual alternator system in the medium load mode when the duty cycle of the PWM signal driving the main alternator is between the low threshold and a high threshold and to operate the dual alternator system in the high load mode when the duty cycle of the PWM signal is at or above the high threshold.

4. The dual alternator system of claim 3, wherein when dual alternator system is in the medium load mode, the ECU sends the LIN controlled alternator voltage regulator the voltage set point having the high value and a MECL value having a sufficiently low value that the LIN controlled alternator voltage regulator controls the secondary alternator in an open loop mode.

5. The dual alternator system of claim 4 wherein when the dual alternator system is in the medium load mode, the ECU sends the LIN controlled alternator voltage a MECL value having a value that causes the LIN controlled alternator voltage regulator to control the secondary alternator in an open loop mode by generating a PWM drive signal that drives the secondary alternator having a constant duty cycle of about thirty percent.

6. The dual alternator of claim 3 wherein when the dual alternator system is in the high load mode, the ECU sends the LIN controlled alternator voltage regulator the voltage set point having the high value and controls the secondary alternator with closed loop control by periodically adjusting the MECL value that the ECU sends to the LIN controlled alternator voltage regulator so that the duty cycle of the PWM drive signal that the LIN controlled alternator voltage regulator is maintained at a level where the secondary alternator provides that amount of current needed so that the duty cycle of the PWM drive signal driving the main alternator is maintained at about the high threshold.

7. In a dual alternator system having a main alternator controlled by an electronic voltage regulator, a secondary alternator controlled by a local interconnect network (LIN) controlled alternator voltage regulator and an ECU coupled to the LIN controlled alternator voltage regulator by a LIN bus, a method of controlling the LIN controlled alternator voltage regulator, comprising:
   determining that the secondary alternator should be off when a duty cycle of a pulse width modulated drive signal generated by the electronic voltage regulator to drive the main alternator is not above a low threshold and determining that the secondary alternator should be operated to generate current when the duty cycle of the pulse width modulated drive signal generated by the electronic voltage regulator to drive the main alternator is above the low threshold;
   upon determining that the secondary alternator should be off, having the ECU send a voltage setpoint signal to the LIN controlled alternator voltage regulator having a low value that is well below nominal system voltage; and
   upon determining that the secondary alternator should be operated to provide current, having the ECU send a voltage setpoint to the LIN controlled alternator voltage regulator having a high value that is well above a nominal system voltage and a MECL setpoint value.

8. The method of claim 7, wherein upon determining that the secondary alternator should be operated to provide current, having the ECU send the LIN controlled alternator voltage regulator the voltage set point having the high value and a MECL value that sets the duty cycle of a PWM drive signal generated by the LIN controlled alternator voltage regulator to drive the secondary alternator.

9. The method of claim 8 wherein upon determining that the secondary alternator should be operated to provide current, further determining to operate the dual alternator system in a medium load mode when the duty cycle of the PWM signal driving the main alternator is between the low threshold and a high threshold and determining to operate the dual alternator system in a high load mode based on the duty cycle of the PWM signal driving the main alternator being at or above the high threshold.

10. The dual alternator system of claim 9, wherein when dual alternator system is in the medium load mode, having the ECU send the LIN controlled alternator voltage regulator the voltage set point having the high value and a MECL value having a sufficiently low value that the LIN controlled alternator voltage regulator controls the secondary alternator in an open loop mode.

11. The dual alternator system of claim 10 wherein when the dual alternator system is in the medium load mode, having the ECU send the LIN controlled alternator voltage a MECL value having a value that causes the LIN controlled alternator voltage regulator to control the secondary alternator in an open loop mode by generating a PWM drive signal that drives the secondary alternator having a constant duty cycle of about thirty percent.

12. The dual alternator of claim 9 wherein when the dual alternator system is in the high load mode, having the send the LIN controlled alternator voltage regulator the voltage set point having the high value and controlling the secondary alternator with closed loop control by periodically adjusting the MECL value that the ECU sends to the LIN controlled alternator voltage regulator so that the duty cycle of the PWM drive signal that the LIN controlled alternator voltage regulator is maintained at a level where the secondary alternator provides that amount of current needed so that the duty cycle of the PWM drive signal driving the main alternator is maintained at about the high threshold.

\* \* \* \* \*